(12) United States Patent
Cheung et al.

(10) Patent No.: US 11,424,633 B2
(45) Date of Patent: Aug. 23, 2022

(54) VAPORIZER CHARGING ADAPTER ASSEMBLY

(71) Applicant: JUUL Labs, Inc., San Francisco, CA (US)

(72) Inventors: Brandon Cheung, San Francisco, CA (US); Kevin Lomeli, San Francisco, CA (US); Claire O' Malley, San Francisco, CA (US)

(73) Assignee: JUUL Labs, Inc., San Francisco, CA (US)

( * ) Notice: Subject to any disclaimer, the term of this patent is extended or adjusted under 35 U.S.C. 154(b) by 187 days.

(21) Appl. No.: 16/596,489

(22) Filed: Oct. 8, 2019

(65) Prior Publication Data

US 2020/0112188 A1    Apr. 9, 2020

Related U.S. Application Data

(60) Provisional application No. 62/742,823, filed on Oct. 8, 2018.

(51) Int. Cl.
*H02J 7/00* (2006.01)
*H01R 13/631* (2006.01)
*H01R 31/06* (2006.01)
*H01M 10/44* (2006.01)

(52) U.S. Cl.
CPC .......... *H02J 7/0045* (2013.01); *H01R 13/631* (2013.01); *H01R 31/06* (2013.01); *H02J 7/00* (2013.01); *H01M 10/44* (2013.01)

(58) Field of Classification Search
CPC ...... A24F 40/90; Y02E 60/10; A61M 11/042; H02J 7/0044; H01R 24/62; H01R 13/443; H01R 13/6335; H01R 13/5213
See application file for complete search history.

(56) References Cited

U.S. PATENT DOCUMENTS

| | | | |
|---|---|---|---|
| 4,619,297 A | 10/1986 | Kocher | |
| 5,240,012 A | 8/1993 | Ehrman et al. | |
| 5,388,594 A | 2/1995 | Counts et al. | |
| 5,664,973 A * | 9/1997 | Emmert | H02J 7/0045 |
| | | | 439/862 |

(Continued)

FOREIGN PATENT DOCUMENTS

| | | |
|---|---|---|
| CN | 203341008 U | 12/2013 |
| EP | 3143884 B1 | 3/2017 |

(Continued)

*Primary Examiner* — Jean F Duverne
(74) *Attorney, Agent, or Firm* — Mintz Levin Cohn Ferris Glovsky and Popeo, P.C.

(57) ABSTRACT

A portable charging adapter system for charging a vaporizer device is described. In some embodiments, the system includes a charging adapter including a charging adapter housing. The charging adapter can include a charging dock positioned along a first surface of the charging adapter housing and a power coupling feature positioned along a second surface of the charging adapter housing. The portable charging adapter system can include a cap that includes a cap housing having an inner chamber. The cap can include a securing element coupled to the inner chamber having at least one cantilevered spring configured to engage the power adapter for securing a coupling of the cap to the charging adapter. Related device, systems, and methods are also described.

18 Claims, 4 Drawing Sheets

(56) References Cited

U.S. PATENT DOCUMENTS

| | | | |
|---|---|---|---|
| 5,666,978 A | 9/1997 | Counts et al. | |
| 5,991,507 A | 11/1999 | Bencsits | |
| 6,326,097 B1 * | 12/2001 | Hockaday | G06F 1/1632 |
| | | | 429/417 |
| 6,848,590 B2 | 2/2005 | Brozell et al. | |
| 8,485,180 B2 | 7/2013 | Smutney et al. | |
| 8,668,529 B2 * | 3/2014 | Park | H01R 13/2435 |
| | | | 439/700 |
| 8,973,587 B2 | 3/2015 | Liu | |
| 9,066,543 B2 | 6/2015 | Cameron | |
| 9,197,726 B2 | 7/2015 | Stanimirovic et al. | |
| 9,247,773 B2 | 2/2016 | Memari et al. | |
| 9,543,703 B2 * | 1/2017 | Horchler | H01R 13/05 |
| 9,602,646 B2 | 3/2017 | Stanimirovic et al. | |
| 9,668,522 B2 | 6/2017 | Memari et al. | |
| 9,675,114 B2 | 6/2017 | Timmermans | |
| 9,924,743 B2 | 3/2018 | Liu | |
| 10,058,130 B2 | 3/2018 | Monsees et al. | |
| 10,039,321 B2 | 8/2018 | Verleur et al. | |
| 10,159,282 B2 | 12/2018 | Monsees et al. | |
| 2003/0063901 A1 | 4/2003 | Gu et al. | |
| 2006/0211279 A1 | 9/2006 | He et al. | |
| 2007/0111583 A1 | 5/2007 | Cuellar et al. | |
| 2010/0151712 A1 | 6/2010 | Chang | |
| 2013/0039639 A1 | 2/2013 | Carney | |
| 2013/0078025 A1 | 3/2013 | Turgeman et al. | |
| 2013/0115821 A1 | 5/2013 | Golko et al. | |
| 2014/0014124 A1 * | 1/2014 | Glasberg | A24F 40/40 |
| | | | 131/328 |
| 2014/0053952 A1 | 2/2014 | Genosar | |
| 2014/0116455 A1 | 5/2014 | Youn | |
| 2014/0174458 A1 | 6/2014 | Katz | |
| 2015/0136158 A1 | 5/2015 | Stevens et al. | |
| 2015/0245654 A1 | 9/2015 | Memari et al. | |
| 2015/0245655 A1 | 9/2015 | Memari et al. | |
| 2015/0245657 A1 | 9/2015 | Memari et al. | |
| 2015/0245662 A1 | 9/2015 | Memari et al. | |
| 2015/0245665 A1 | 9/2015 | Memari et al. | |
| 2015/0245666 A1 | 9/2015 | Memari et al. | |
| 2015/0245667 A1 | 9/2015 | Memari et al. | |
| 2015/0245668 A1 | 9/2015 | Memari et al. | |
| 2015/0342259 A1 | 12/2015 | Baker et al. | |
| 2016/0167846 A1 | 6/2016 | Zahr et al. | |
| 2016/0174611 A1 | 6/2016 | Monsees et al. | |
| 2016/0206002 A1 | 7/2016 | Borkovec et al. | |
| 2016/0211693 A1 | 7/2016 | Stevens et al. | |
| 2016/0219937 A1 | 8/2016 | Rado | |
| 2016/0325858 A1 | 11/2016 | Ampolini et al. | |
| 2016/0331026 A1 | 11/2016 | Cameron | |
| 2017/0013880 A1 | 1/2017 | O'Brien et al. | |
| 2017/0157341 A1 | 6/2017 | Pandya et al. | |
| 2017/0208862 A1 | 7/2017 | Li et al. | |
| 2017/0231282 A1 | 8/2017 | Bowen et al. | |
| 2017/0273357 A1 | 9/2017 | Barbuck | |
| 2017/0273358 A1 | 9/2017 | Batista et al. | |
| 2017/0302324 A1 | 10/2017 | Stanimirovic et al. | |
| 2017/0353591 A1 * | 12/2017 | Abramovich | H04B 1/3883 |
| 2018/0077967 A1 | 3/2018 | Hatton et al. | |
| 2018/0110263 A1 | 4/2018 | Borkovec et al. | |
| 2018/0317557 A1 | 11/2018 | Monsees et al. | |
| 2020/0000146 A1 * | 1/2020 | Anderson | H01R 43/26 |
| 2020/0127475 A1 | 4/2020 | Cheung et al. | |

FOREIGN PATENT DOCUMENTS

| | | |
|---|---|---|
| EP | 3183174 B1 | 6/2017 |
| EP | 3326473 A1 | 5/2018 |
| EP | 3566280 B1 | 11/2019 |
| GB | 1213318 A | 11/1970 |
| JP | 2012506263 A | 3/2012 |
| WO | WO-9406314 A1 | 3/1994 |
| WO | WO-9501137 A1 | 1/1995 |
| WO | WO-2015079197 A1 | 6/2015 |
| WO | WO-2015148649 A2 | 10/2015 |
| WO | WO-2015184620 A1 | 12/2015 |
| WO | WO-2015184747 A1 | 12/2015 |
| WO | WO-2016023183 A1 | 2/2016 |
| WO | WO-2017036865 A1 | 3/2017 |

* cited by examiner

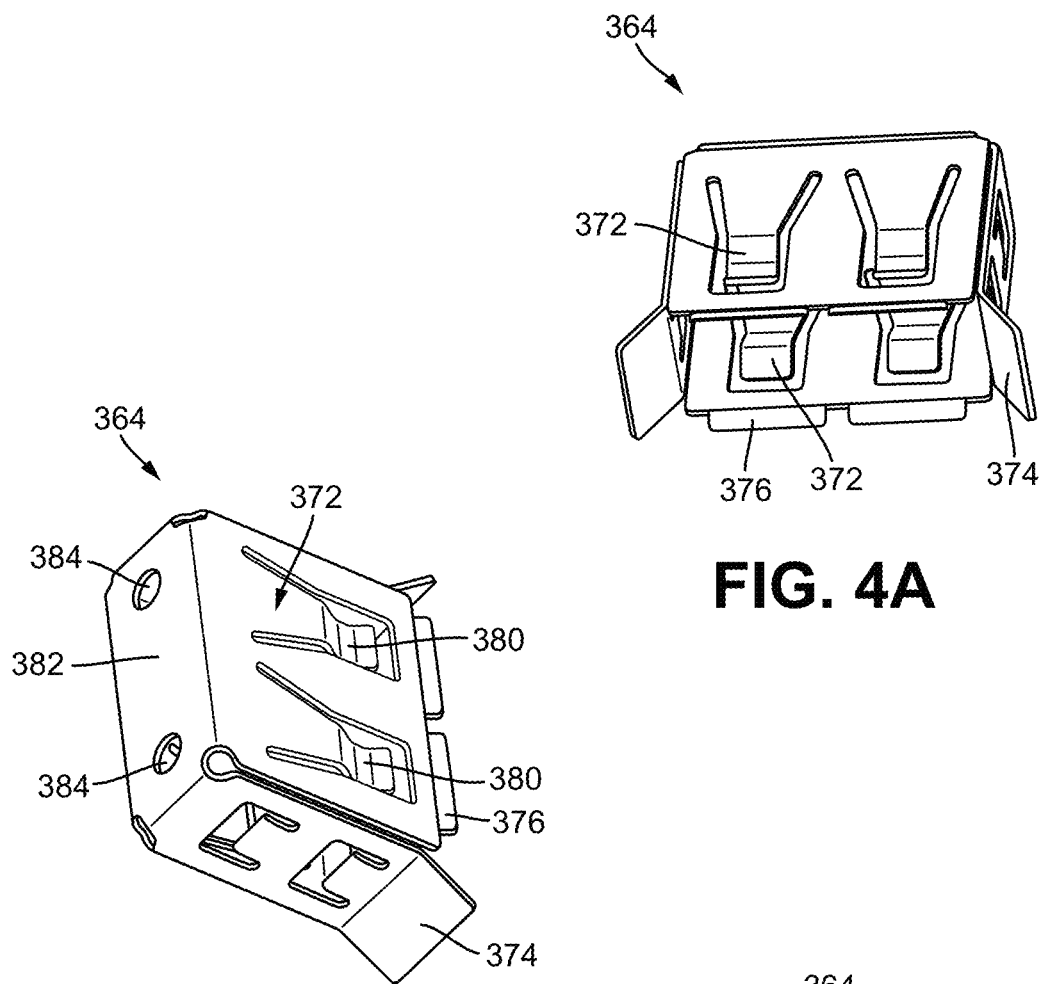
FIG. 4A
FIG. 4B
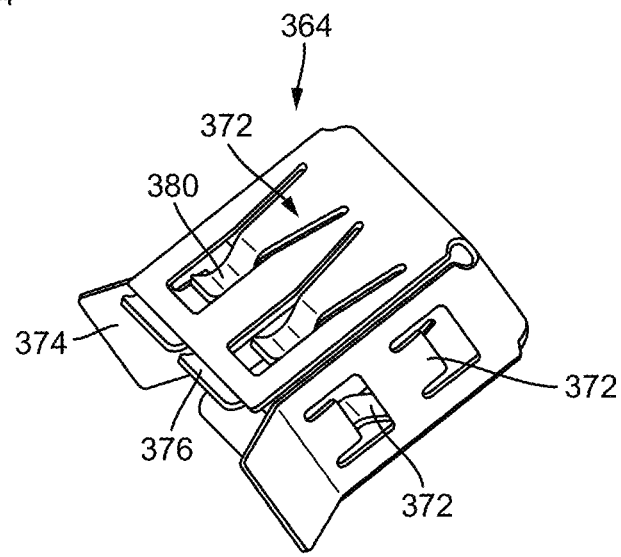
FIG. 4C

VAPORIZER CHARGING ADAPTER ASSEMBLY

CROSS REFERENCE

The present application claims priority to U.S. Provisional Patent Application No. 62/742,823 entitled "Vaporizer Charging Adapter Assembly" filed Oct. 8, 2018, which is hereby incorporated by reference in its entirety.

TECHNICAL FIELD

The subject matter described herein relates to a charging adapter assembly, including a charging adapter configured to charge a vaporizer device.

BACKGROUND

Vaporizer devices, which can also be referred to as vaporizers, electronic vaporizer devices or e-vaporizer devices, can be used for delivery of an aerosol (or "vapor") containing one or more active ingredients by inhalation of the aerosol by a user of the vaporizing device. For example, electronic nicotine delivery systems (ENDS) include a class of vaporizer devices that are battery powered and that may be used to simulate the experience of smoking, but without burning of tobacco or other substances.

In use of a vaporizer device, the user inhales an aerosol, commonly called vapor, which may be generated by a heating element that vaporizes (e.g., causing a liquid or solid to at least partially transition to the gas phase) a vaporizable material, which may be liquid, a solution, a solid, a wax, or any other form as may be compatible with use of a specific vaporizer device. The vaporizable material used with a vaporizer can be provided within a cartridge (e.g., a separable part of the vaporizer that contains the vaporizable material in a reservoir) that includes a mouthpiece (e.g., for inhalation by a user).

To receive the inhalable aerosol generated by a vaporizer device, a user may, in certain examples, activate the vaporizer device by taking a puff, by pressing a button, or by some other approach. A puff, as the term is generally used (and also used herein), refers to inhalation by the user in a manner that causes a volume of air to be drawn into the vaporizer device such that the inhalable aerosol is generated by a combination of vaporized vaporizable material with the air.

The term vaporizer device, as used herein consistent with the current subject matter, generally refers to portable, self-contained, devices that are convenient for personal use. Typically, such devices are controlled by one or more switches, buttons, touch sensitive devices, or other user input functionality or the like (which can be referred to generally as controls) on the vaporizer, although a number of devices that may wirelessly communicate with an external controller (e.g., a smartphone, a smart watch, other wearable electronic devices, etc.) have recently become available. Control, in this context, refers generally to an ability to influence one or more of a variety of operating parameters, which may include without limitation any of causing the heater to be turned on and/or off, adjusting a minimum and/or maximum temperature to which the heater is heated during operation, interactive features that a user might access on a device, and/or other operations.

SUMMARY

Aspects of the current subject matter relate inter alia to a portable charging adapter system for charging a vaporizer device. The portable charging adapter system may include a charging adapter. The charging adapter may include a charging adapter housing and a charging dock positioned along a first surface of the charging adapter housing. The charging adapter may include a power coupling feature positioned along a second surface of the charging adapter housing.

In one aspect consistent with the current disclosure, the portable charging adapter system may include a charging adapter cap. The charging adapter cap may include a cap housing having an inner chamber. The inner chamber may include a first pair of opposed side walls, a second pair of opposed side walls, an end wall, and an open end opposed to the end wall. The charging adapter cap may include a securing element coupled to the inner chamber. The securing element may include at least one cantilevered spring extending from one or more securing element sides of the securing element. The at least one cantilevered spring may be configured to engage the power coupling feature to thereby secure a coupling of the charging adapter to the cap housing.

In an interrelated aspect, the charging dock may include a pair of charging contacts that are configured to mate with a pair of vaporizer contacts of the vaporizer device. The charging dock may include a recess in the charging adapter housing. The recess may include an inner perimeter wall that is shaped to have a sliding fit with an outer surface of a charging end of the vaporizer device.

In an interrelated aspect, a first cantilevered spring of the at least one cantilevered spring may include a first cutout from a first securing element side of the one or more securing element sides. The first cantilevered spring may include a first deformed feature that extends inward from the first securing element side. The first deformed feature may be configured to engage a first side of the power coupling feature. A second cantilevered spring of the at least one cantilevered spring may include a second cutout from a second securing element side of the one or more securing element sides. The second cantilevered spring may include a second deformed feature that extends inward from the second securing element side. The second deformed feature may be configured to engage a second side of the power coupling feature. The first securing element side may be orthogonal to the second securing element side. The power coupling feature may include a universal serial bus (USB). The first surface may be positioned orthogonal to the second surface. The charging adapter housing may include a linking feature configured to allow the charging adapter cap to be coupled to a coupling feature. The securing element may include a through hole positioned to receive an extruded feature along the inner chamber to thereby allow a heat-staking of the securing element within the charging adapter cap.

In an interrelated aspect, a method for a portable charging adapter system for charging a vaporizer device may include receiving, at a charging dock of a charging adapter of the portable charging adapter system, a charging end of the vaporizer device. The charging adapter may include a charging adapter housing. The charging dock may be positioned along a first surface of the charging adapter housing. A power coupling feature may be positioned along a second surface of the charging adapter housing. The method may include coupling a charging adapter cap of the portable charging adapter system to the charging adapter. The method may include coupling the power coupling feature to a power source.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein, and, together with the description, help explain some of the principles associated with the disclosed implementations. In the drawings:

FIGS. 4A-4C illustrate first, second, and third perspective views, respectively, of an embodiment of a securing element consistent with implementations of the current subject matter.

When practical, similar reference numbers denote similar structures, features, or elements.

DETAILED DESCRIPTION

Figure 1:
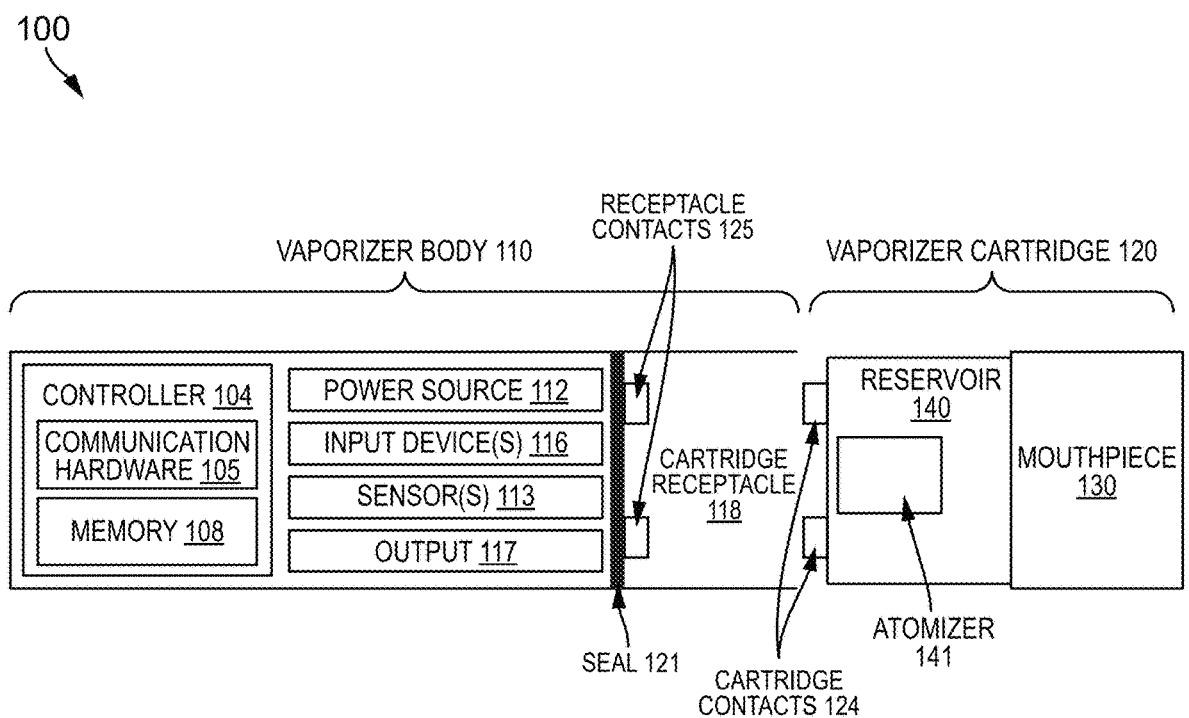
FIG. 1 illustrates a block diagram of a vaporizer consistent with implementations of the current subject matter.

Implementations of the current subject matter include devices relating to vaporizing of one or more materials for inhalation by a user. The term "vaporizer" is used generically in the following description to refer to a vaporizer device. Examples of vaporizers consistent with implementations of the current subject matter include electronic vaporizers or the like. Such vaporizers are generally portable, hand-held devices that heat a vaporizable material to provide an inhalable dose of the material.

The vaporizer device can include a power supply, such as a rechargeable battery. Certain rechargeable batteries may need to be recharged quickly so that the user can continue to use the vaporizer. Some vaporizers may be recharged by, for example, connecting the device to an external power supply via a wired connection or a USB connection with a desktop computer, and/or connected with a wall outlet. Some charging adapters can be used to couple a vaporizer to an external power supply to allow the vaporizer to recharge. Such charging adapters can be easily misplaced, hard to find, and fragile such that they become inefficient or unusable after minimal use. The charging adapter assembly, consistent with implementations of the current subject matter, can provide a portable charging adapter that is durable, effective, and easy to find and transport.

Typical portable charging devices and/or charging adapters, in particular, those for use with vaporizers, may include one or more features, such as, for example, weight, lack of easy portability, bulkiness, and tendency to be easily misplaced, which can be improved upon. Charging adapter assemblies consistent with implementations of the current subject matter can desirably provide a low profile charging adapter that can secure and/or provide a power connection between a vaporizer and an external power source. The charging adapter assembly can further include a removable cap that may protect a USB feature of the charging adapter. The cap may include a variety of features for securing to and protecting the charging adapter, as well as improve usability and convenience for a user.

The charging adapter assembly can be lightweight and/or less bulky compared to at least some currently available vaporizer charging adapter devices. The charging adapter assembly can be generally aesthetically pleasing and/or easy to use. The charging cap may be easy to remove and/or couple to the charging adapter. In some implementations, the charging adapter assembly can be dust, lint and/or water resistant, and/or may limit dust or liquids from entering the interior volume of the charging adapter, such as when the cap is coupled to the charging adapter. The charging adapter assembly may have rounded edges. The charging adapter assembly may be made of a corrosion resistant material, a biocompatible material, a plastic material, an aluminum material, and/or other materials. Various embodiments of a charging adapter assembly are described in greater detail below.

The vaporizable material used with a vaporizer may optionally be provided within a cartridge (e.g., a part of the vaporizer that contains the vaporizable material in a reservoir or other container and that can be refillable when empty or disposable in favor of a new cartridge containing additional vaporizable material of a same or different type).

A vaporizer may be a cartridge-using vaporizer, a cartridge-less vaporizer, or a multi-use vaporizer capable of use with or without a cartridge. For example, a multi-use vaporizer may include a heating chamber (e.g., an oven) configured to receive a vaporizable material directly in the heating chamber and also to receive a cartridge or other replaceable device having a reservoir, a volume, or the like for at least partially containing a usable amount of vaporizable material. In various implementations, a vaporizer may be configured for use with liquid vaporizable material (e.g., a carrier solution in which an active and/or inactive ingredient(s) are suspended or held in solution or a neat liquid form of the vaporizable material itself) or a solid vaporizable material. A solid vaporizable material may include a plant material that emits some part of the plant material as the vaporizable material (e.g., such that some part of the plant material remains as waste after the vaporizable material is emitted for inhalation by a user) or optionally can be a solid form of the vaporizable material itself (e.g., a "wax") such that all of the solid material can eventually be vaporized for inhalation. A liquid vaporizable material can likewise be capable of being completely vaporized or can include some part of the liquid material that remains after all of the material suitable for inhalation has been consumed.

Referring to the block diagram of FIG. 1, a vaporizer 100 typically includes a power source 112 (such as a battery which may be a rechargeable battery), and a controller 104 (e.g., a processor, circuitry, etc. capable of executing logic) for controlling delivery of heat to an atomizer 141 to cause a vaporizable material to be converted from a condensed form (e.g., a solid, a liquid, a solution, a suspension, a part of an at least partially unprocessed plant material, etc.) to the gas phase. The controller 104 may be part of one or more printed circuit boards (PCBs) consistent with certain implementations of the current subject matter.

After conversion of the vaporizable material to the gas phase, and depending on the type of vaporizer, the physical and chemical properties of the vaporizable material, and/or other factors, at least some of the gas-phase vaporizable material may condense to form particulate matter in at least a partial local equilibrium with the gas phase as part of an aerosol, which can form some or all of an inhalable dose provided by the vaporizer 100 for a given puff or draw on the vaporizer. It will be understood that the interplay between gas and condensed phases in an aerosol generated by a vaporizer can be complex and dynamic, as factors such as ambient temperature, relative humidity, chemistry, flow conditions in airflow paths (both inside the vaporizer and in the airways of a human or other animal), mixing of the gas-phase or aerosol-phase vaporizable material with other air streams, etc. may affect one or more physical parameters of an aerosol. In some vaporizers, and particularly for vaporizers for delivery of more volatile vaporizable materials, the inhalable dose may exist predominantly in the gas phase (i.e., formation of condensed phase particles may be very limited).

Vaporizers for use with liquid vaporizable materials (e.g., neat liquids, suspensions, solutions, mixtures, etc.) typically include an atomizer 141 in which a wicking element (also referred to herein as a wick (not shown in FIG. 1), which can include any material capable of causing fluid motion by capillary pressure) conveys an amount of a liquid vaporizable material to a part of the atomizer that includes a heating element (also not shown in FIG. 1). The wicking element is generally configured to draw liquid vaporizable material from a reservoir configured to contain (and that may in use contain) the liquid vaporizable material such that the liquid vaporizable material may be vaporized by heat delivered from a heating element. The wicking element may also optionally allow air to enter the reservoir to replace the volume of liquid removed. In other words, capillary action pulls liquid vaporizable material into the wick for vaporization by the heating element (described below), and air may, in some implementations of the current subject matter, return to the reservoir through the wick to at least partially equalize pressure in the reservoir. Other approaches to allowing air back into the reservoir to equalize pressure are also within the scope of the current subject matter.

The heating element can be, or include, one or more of a conductive heater, a radiative heater, and a convective heater. One type of heating element is a resistive heating element, which can be constructed of or at least include a material (e.g., a metal or alloy, for example a nickel-chromium alloy, or a non-metallic resistor) configured to dissipate electrical power in the form of heat when electrical current is passed through one or more resistive segments of the heating element. In some implementations of the current subject matter, an atomizer can include a heating element that includes resistive coil or other heating element wrapped around, positioned within, integrated into a bulk shape of, pressed into thermal contact with, or otherwise arranged to deliver heat to a wicking element to cause a liquid vaporizable material drawn by the wicking element from a reservoir to be vaporized for subsequent inhalation by a user in a gas and/or a condensed (e.g., aerosol particles or droplets) phase. Other wicking element, heating element, and/or atomizer assembly configurations are also possible, as discussed further below.

Certain vaporizers may also or alternatively be configured to create an inhalable dose of gas-phase and/or aerosol-phase vaporizable material via heating of a non-liquid vaporizable material, such as for example a solid-phase vaporizable material (e.g., a wax or the like) or plant material (e.g., tobacco leaves and/or parts of tobacco leaves) containing the vaporizable material. In such vaporizers, a resistive heating element may be part of or otherwise incorporated into or in thermal contact with the walls of an oven or other heating chamber into which the non-liquid vaporizable material is placed. Alternatively, a resistive heating element or elements may be used to heat air passing through or past the non-liquid vaporizable material to cause convective heating of the non-liquid vaporizable material. In still other examples, a resistive heating element or elements may be disposed in intimate contact with plant material such that direct conductive heating of the plant material occurs from within a mass of the plant material (e.g., as opposed to only by conduction inward form walls of an oven). Such non-liquid vaporizable materials may be used with cartridge using or cartridge less vaporizers.

The heating element may be activated (e.g., a controller, which is optionally part of a vaporizer body as discussed below, may cause current to pass from the power source through a circuit including the resistive heating element, which is optionally part of a vaporizer cartridge as discussed below), in association with a user puffing (e.g., drawing, inhaling, etc.) on a mouthpiece 130 of the vaporizer to cause air to flow from an air inlet, along an airflow path that passes an atomizer (e.g., wicking element and heating element), optionally through one or more condensation areas or chambers, to an air outlet in the mouthpiece. Incoming air passing along the airflow path passes over, through, etc. the atomizer, where gas phase vaporizable material is entrained into the air. As noted above, the entrained gas-phase vaporizable material may condense as it passes through the remainder of the airflow path such that an inhalable dose of the vaporizable material in an aerosol form can be delivered from the air outlet (e.g., in a mouthpiece 130 for inhalation by a user).

Activation of the heating element may be caused by automatic detection of the puff based on one or more of signals generated by one or more sensors 113, such as for example a pressure sensor or sensors disposed to detect pressure along the airflow path relative to ambient pressure (or optionally to measure changes in absolute pressure), one or more motion sensors of the vaporizer, one or more flow sensors of the vaporizer, a capacitive lip sensor of the vaporizer; in response to detection of interaction of a user with one or more input devices 116 (e.g., buttons or other tactile control devices of the vaporizer 100), receipt of signals from a computing device in communication with the vaporizer; and/or via other approaches for determining that a puff is occurring or imminent.

As alluded to in the previous paragraph, a vaporizer consistent with implementations of the current subject matter may be configured to connect (e.g., wirelessly or via a wired connection) to a computing device (or optionally two or more devices) in communication with the vaporizer. To this end, the controller 104 may include communication hardware 105. The controller 104 may also include a memory 108. A computing device can be a component of a vaporizer system that also includes the vaporizer 100, and can include its own communication hardware, which can establish a wireless communication channel with the communication hardware 105 of the vaporizer 100. For example, a computing device used as part of a vaporizer system may include a general-purpose computing device (e.g., a smartphone, a tablet, a personal computer, some other portable device such as a smartwatch, or the like) that executes software to produce a user interface for enabling a user of the device to interact with a vaporizer. In other implementations of the current subject matter, such a device used as part of a vaporizer system can be a dedicated piece of hardware such as a remote control or other wireless or wired device having one or more physical or soft (e.g., configurable on a screen or other display device and selectable via user interaction with a touch-sensitive screen or some other input device like a mouse, pointer, trackball, cursor buttons, or the like) interface controls. The vaporizer can also include one or more output 117 features or devices for providing information to the user.

A computing device that is part of a vaporizer system as defined above can be used for any of one or more functions, such as controlling dosing (e.g., dose monitoring, dose setting, dose limiting, user tracking, etc.), controlling sessioning (e.g., session monitoring, session setting, session limiting, user tracking, etc.), controlling nicotine delivery (e.g., switching between nicotine and non-nicotine vaporizable material, adjusting an amount of nicotine delivered, etc.), obtaining locational information (e.g., location of other users, retailer/commercial venue locations, vaping locations, relative or absolute location of the vaporizer itself, etc.), vaporizer personalization (e.g., naming the vaporizer, locking/password protecting the vaporizer, adjusting one or more parental controls, associating the vaporizer with a user group, registering the vaporizer with a manufacturer or warranty maintenance organization, etc.), engaging in social activities (e.g., social media communications, interacting with one or more groups, etc.) with other users, or the like. The terms "sessioning", "session", "vaporizer session," or "vapor session," are used generically to refer to a period devoted to the use of the vaporizer. The period can include a time period, a number of doses, an amount of vaporizable material, and/or the like.

In the example in which a computing device provides signals related to activation of the resistive heating element, or in other examples of coupling of a computing device with a vaporizer for implementation of various control or other functions, the computing device executes one or more computer instructions sets to provide a user interface and underlying data handling. In one example, detection by the computing device of user interaction with one or more user interface elements can cause the computing device to signal the vaporizer 100 to activate the heating element, either to a full operating temperature for creation of an inhalable dose of vapor/aerosol. Other functions of the vaporizer may be controlled by interaction of a user with a user interface on a computing device in communication with the vaporizer.

The temperature of a resistive heating element of a vaporizer may depend on a number of factors, including an amount of electrical power delivered to the resistive heating element and/or a duty cycle at which the electrical power is delivered, conductive heat transfer to other parts of the electronic vaporizer and/or to the environment, latent heat losses due to vaporization of a vaporizable material from the wicking element and/or the atomizer as a whole, and convective heat losses due to airflow (e.g., air moving across the heating element or the atomizer as a whole when a user inhales on the electronic vaporizer). As noted above, to reliably activate the heating element or heat the heating element to a desired temperature, a vaporizer may, in some implementations of the current subject matter, make use of signals from a pressure sensor to determine when a user is inhaling. The pressure sensor can be positioned in the airflow path and/or can be connected (e.g., by a passageway or other path) to an airflow path connecting an inlet for air to enter the device and an outlet via which the user inhales the resulting vapor and/or aerosol such that the pressure sensor experiences pressure changes concurrently with air passing through the vaporizer device from the air inlet to the air outlet. In some implementations of the current subject matter, the heating element may be activated in association with a user's puff, for example by automatic detection of the puff, for example by the pressure sensor detecting a pressure change in the airflow path.

Typically, the pressure sensor (as well as any other sensors 113) can be positioned on or coupled (e.g., electrically or electronically connected, either physically or via a wireless connection) to the controller 104 (e.g., a printed circuit board assembly or other type of circuit board). To take measurements accurately and maintain durability of the vaporizer, it can be beneficial to provide a resilient seal 121 to separate an airflow path from other parts of the vaporizer. The seal 121, which can be a gasket, may be configured to at least partially surround the pressure sensor such that connections of the pressure sensor to internal circuitry of the vaporizer are separated from a part of the pressure sensor exposed to the airflow path. In an example of a cartridge-based vaporizer, the seal 121 may also separate parts of one or more electrical connections between a vaporizer body 110 and a vaporizer cartridge 120. Such arrangements of a seal 121 in a vaporizer 100 can be helpful in mitigating against potentially disruptive impacts on vaporizer components resulting from interactions with environmental factors such as water in the vapor or liquid phases, other fluids such as the vaporizable material, etc. and/or to reduce escape of air from the designed airflow path in the vaporizer. Unwanted air, liquid or other fluid passing and/or contacting circuitry of the vaporizer can cause various unwanted effects, such as alter pressure readings, and/or can result in the buildup of unwanted material, such as moisture, the vaporizable material, etc. in parts of the vaporizer where they may result in poor pressure signal, degradation of the pressure sensor or other components, and/or a shorter life of the vaporizer. Leaks in the seal 121 can also result in a user inhaling air that has passed over parts of the vaporizer device containing or constructed of materials that may not be desirable to be inhaled.

A general class of vaporizers that have recently gained popularity includes a vaporizer body 110 that includes a controller 104, a power source 112 (e.g., battery), one more sensors 113, charging contacts, a seal 121, and a cartridge receptacle 118 configured to receive a vaporizer cartridge 120 for coupling with the vaporizer body through one or more of a variety of attachment structures. In some examples, vaporizer cartridge 120 includes a reservoir 140 for containing a liquid vaporizable material and a mouthpiece 130 for delivering an inhalable dose to a user. The vaporizer cartridge can include an atomizer 141 having a wicking element and a heating element, or alternatively, one or both of the wicking element and the heating element can be part of the vaporizer body. In implementations in which any part of the atomizer 141 (e.g., heating element and/or wicking element) is part of the vaporizer body, the vaporizer can be configured to supply liquid vaporizer material from a reservoir in the vaporizer cartridge to the atomizer part(s) included in the vaporizer body.

Cartridge-based configurations for vaporizers that generate an inhalable dose of a non-liquid vaporizable material via heating of a non-liquid vaporizable material are also within the scope of the current subject matter. For example, a vaporizer cartridge may include a mass of a plant material that is processed and formed to have direct contact with parts of one or more resistive heating elements, and such a vaporizer cartridge may be configured to be coupled mechanically and electrically to a vaporizer body the includes a processor, a power source, and electrical contacts for connecting to corresponding cartridge contacts for completing a circuit with the one or more resistive heating elements.

In vaporizers in which the power source 112 is part of a vaporizer body 110 and a heating element is disposed in a vaporizer cartridge 120 configured to couple with the vaporizer body 110, the vaporizer 100 may include electrical connection features (e.g., means for completing a circuit) for completing a circuit that includes the controller 104 (e.g., a printed circuit board, a microcontroller, or the like), the power source, and the heating element. These features may include at least two contacts on a bottom surface of the vaporizer cartridge 120 (referred to herein as cartridge contacts 124) and at least two contacts disposed near a base of the cartridge receptacle (referred to herein as receptacle contacts 125) of the vaporizer 100 such that the cartridge contacts 124 and the receptacle contacts 125 make electrical connections when the vaporizer cartridge 120 is inserted into and coupled with the cartridge receptacle 118. The circuit completed by these electrical connections can allow delivery of electrical current to the resistive heating element and may further be used for additional functions, such as for example for measuring a resistance of the resistive heating element for use in determining and/or controlling a temperature of the resistive heating element based on a thermal coefficient of resistivity of the resistive heating element, for identifying a cartridge based on one or more electrical characteristics of a resistive heating element or the other circuitry of the vaporizer cartridge, etc.

Some vaporizer embodiments include a power source that is rechargeable. As such, a charger that directly charges the power source or a charging adapter that couples the vaporizer to a power source may be needed to recharge the rechargeable power source of the vaporizer. As such, various embodiments of a charging adapter assembly are described herein that provide various advantages relative to existing approaches. For example, the charging adapter assembly embodiments described herein provide a compact and durable charging adapter including a USB feature for coupling to various devices having standard USB coupling features (e.g., computer, power adapters, etc.). Furthermore, the charging adapter assembly embodiments described herein include a protective cap that protects the USB feature of the charging adapter thereby prolonging the life and effectiveness of the charging adapter. The cap may include a variety of features for securing to and protecting the charging adapter, as well as improve usability and convenience for a user. The charging adapter assembly can be lightweight and/or less bulky compared to at least some currently available vaporizer charging devices. The charging adapter assembly can be generally aesthetically pleasing and/or easy to use. The cap may be easy to remove and/or couple to the charging adapter. In some implementations, the charging adapter assembly can be dust, lint and/or water resistant, and/or may limit dust or liquids from entering the interior volume of the charging adapter, such as when the cap is coupled to the charging adapter. Other features and benefits associated with embodiments of the charging adapter assembly are described in detail below.

Figure 2A:
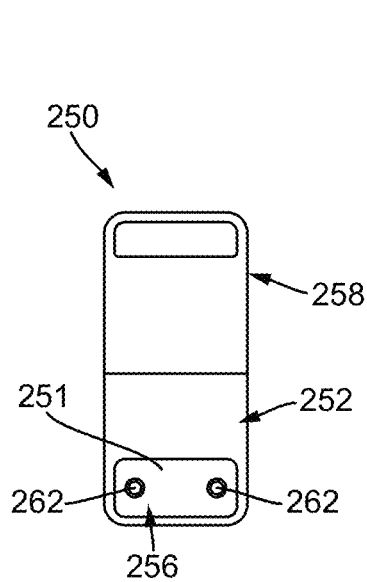
FIG. 2A illustrates an embodiment of a charging adapter assembly including a charging adapter and a cap with the cap shown releasably secured to the charging adapter consistent with implementations of the current subject matter.
Figure 2B:
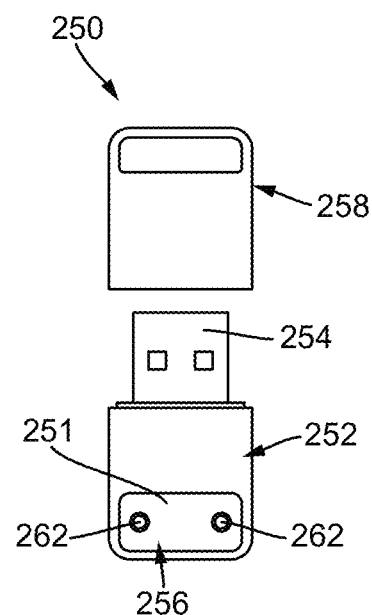
FIGS. 2B and 2D illustrate the charging adapter assembly of FIG. 2A showing the cap decoupled from the charging adapter.
Figure 2C:
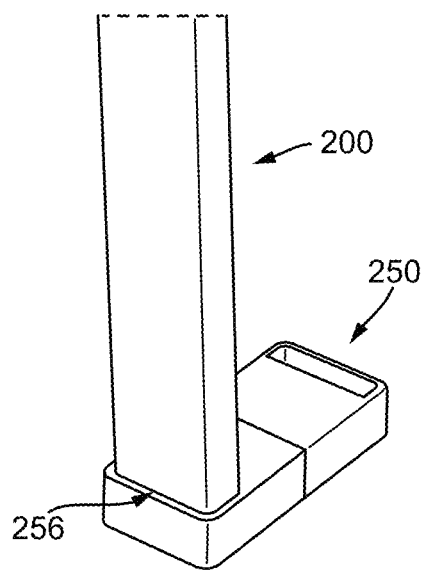
FIG. 2C illustrates the charging adapter assembly of FIG. 2A showing a vaporizer coupled to the charging adapter.
Figure 2D:
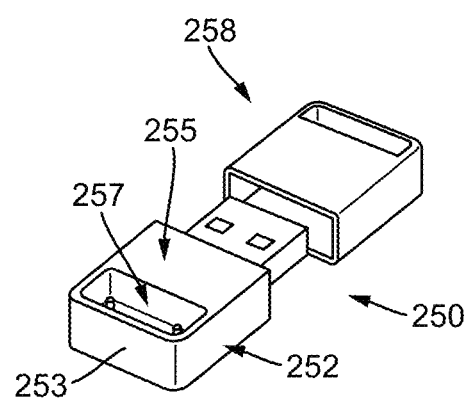

FIGS. 2A-2D illustrate an embodiment of a charging adapter assembly 250 including a charging adapter 252 and a cap 258 that can be releasably secured to the charging adapter 252. As shown in FIGS. 2B and 2D, the charging adapter 252 can include a USB feature 254 and a vaporizer coupling or docking feature 256. As shown in FIG. 2A, the cap 258 can be secured over and protect the USB feature 254 of the charging adapter 252, such as when the charging adapter 252 is not being used to charge a vaporizer 200. Furthermore, as shown in FIGS. 2B and 2D, the cap 258 can be uncoupled from the charging adapter 252 thereby exposing the USB feature 254. When the cap 258 is removed, the USB feature 254 can be coupled to a USB coupling feature (e.g., USB female receptacle along a computing device, power adapter, etc.) to thereby allow the charging adapter 252 to assist with charging a vaporizer 200 coupled thereto.

As shown in FIG. 2C, a vaporizer 200 can be coupled to the vaporizer coupling feature 256 of the charging adapter 252. The vaporizer coupling feature 256 may include a recess 257 along the body of the charging adapter 252. The recess 257 can be shaped similar to or the same as a profile shape of the vaporizer 200 (e.g., a charging end of the vaporizer). In some embodiments, the recess 257 is defined by a base 251 and one or more recess walls 253 extending between the base 251 and a top surface 255 of the charging adapter 252. For example, the recess 257 can have a rectangular shape that provides a sliding fit between the recess walls 253 and a charging end of the vaporizer 200. As shown in FIGS. 2A and 2B, the vaporizer coupling feature 256 can include one or more charging contacts 262 positioned along the base 251 of the recess 257. For example, the charging end of the vaporizer 200 can include one or more vaporizer charging contacts, such as the receptacle contacts 125, described above, that are in communication with the power source 112 (e.g., rechargeable battery) of the vaporizer 200, which can align with and contact the charging contacts 262 when the charging end of the vaporizer 200 is coupled to the vaporizer coupling feature 256. As such, when the vaporizer 200 is coupled to the vaporizer coupling feature 256 of the charging adapter 252, the charging contacts 262 of the charging adapter 252 may be aligned with and contact the cartridge contacts 124 of the vaporizer 200, as shown in FIG. 2C. Additionally, once the USB feature 254 is coupled to an external power source, the charging adapter 252 may provide an electrical pathway that allows the external power source to recharge the power source 112 of the vaporizer 200.

As shown in FIG. 2D, the vaporizer coupling feature 256 can be positioned along the top surface 255 of the charging adapter 252 and the USB feature 254 can extend from an end of the charging adapter 252, such that the USB feature 254 extends approximately ninety degrees relative to the base 251. For example, the top surface and surface along which the USB feature 254 extends from can be orthogonal relative to each other. As such, when the vaporizer 200 is coupled to the vaporizer coupling feature 256, the vaporizer 200 can extend approximately ninety degrees relative to the USB feature 254. This configuration can allow the vaporizer 200 to charge while taking up minimal lateral space (e.g., desk space).

Damage to the USB feature 254, including collection of debris within and/or on the USB feature 254, can reduce the efficiency of the charging adapter 252 and may prevent the charging adapter 252 from providing the electrical pathway thus rendering the charging adapter 252 unusable for charging a vaporizer 200. As such, protecting the USB feature 254 can be important for maintaining the effectiveness of the charging adapter 252, as well as prolonging the life of the charging adapter 252. As such, embodiments of the charging adapter assembly 250 described herein include the cap 258 for at least protecting the USB feature 254. Other features and benefits may be associated with the cap 258, some of which are described herein.

Figure 3A:
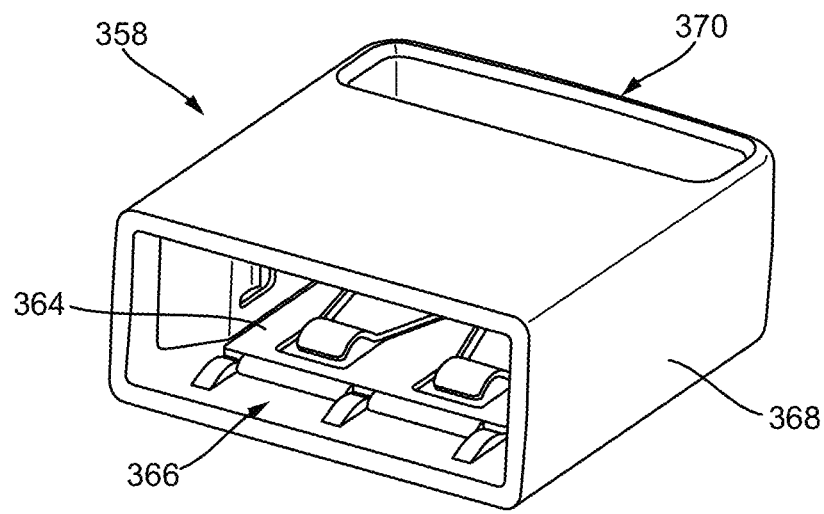
FIG. 3A illustrates a perspective view of an embodiment of a cap of a charging adapter assembly with the cap including a securing element consistent with implementations of the current subject matter.
Figure 3B:
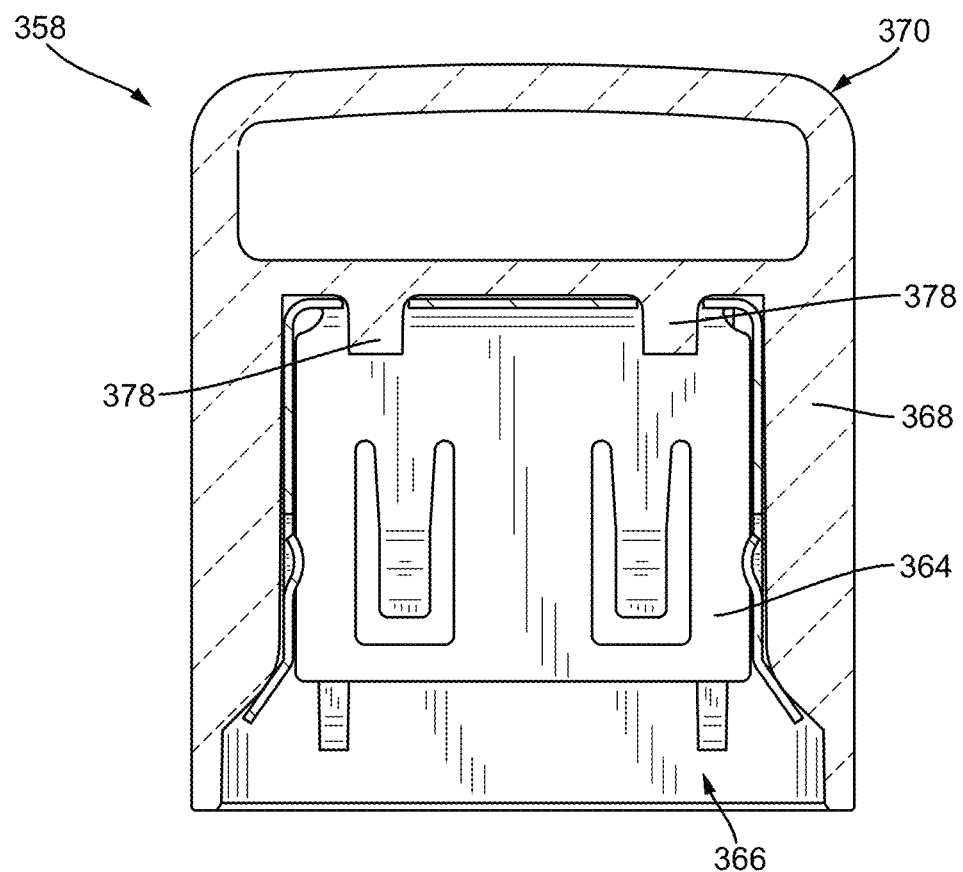
FIG. 3B illustrates a section view of the cap of FIG. 3A showing the securing element coupled to and secured within an inner chamber of a housing of the cap.

FIGS. 3A and 3B illustrate an embodiment of a cap 358 of a charging adapter assembly (e.g., charging adapter assembly 250) with the cap 358 including a cap housing 368 and a securing element 364. As shown in FIG. 3B, the securing element 364 may be secured within an inner chamber 366 of a cap housing 368 of the cap 358. The securing element 364 can be configured to securely couple the cap 358 to a charging adapter (e.g., charging adapter 252) of the charging adapter assembly thereby ensuring protection of a USB feature (e.g., USB feature 254) of the charging adapter assembly. The cap housing 368 of the cap 358 may further include a linking feature 370 that can allow the charging adapter assembly to be secured to a lanyard, keychain, and/or other feature that may allow a user to easily carry and/or find the charging adapter assembly. As shown in FIG. 3B, the linking feature 370 can include a through hole and/or bridge adjacent a side of the cap housing 368. The cap housing 368 may be made of a variety of materials, such as one or more plastic materials. The securing element 364 may be made of a metal or hard plastic material. Additionally, the body of the charging adapter may be made out a variety of materials, including one or more of a variety of plastic materials. In addition, the USB feature 254 and charging contacts 262 may be made of a metallic material and/or a conductive material.

FIGS. 4A-4C illustrate a plurality of views of the securing element 364 of the cap 358 shown in FIGS. 3A and 3B. As shown in FIG. 4B, the securing element 364 can include a first end 382 with at least one through hole 384 extending therethrough. The through hole 384 can allow the securing element 364 to be heat-staked within the inner chamber 366 of the cap housing 368. For example, during assembly the securing element 364 may be slid into the inner chamber 366 of the cap housing 368 and heat-staked into place thereby securing a coupling between the securing element 364 and the cap housing 368. For example, a distal end of the inner chamber 366 may include raised pegs 378 that may couple with the through hole 384 of the securing element 364. The raised pegs 378 may be made of a material that can be melted to thereby heat-stake the securing element 364 to the cap housing 368 of the cap 358.

As shown in FIGS. 4A-4C, the securing element 364 includes a plurality of engaging features 372 that are cut out and include a deformed feature 380 that extends inward towards a center of the securing element 364. For example, the deformed feature 380 can include a rounded or bent configuration that extends at least partly towards the center of the securing element 364. As such, the deformed feature 380 of the plurality of engaging features 372 can engage with a USB feature (e.g., USB feature 254) positioned in the securing element 364, such as for releasably coupling the USB feature to the cap 358. In some embodiments, the securing element 364 can be made out of a material that allows the cut out engaging features to form a cantilevered spring. For example, as the USB feature is inserted into the open end of the securing element, the deformed features can provide a spring force against the sides of the USB feature to secure the cap 358 to at least the USB feature 254.

As such, the engaging features 372 can center and secure the USB feature 254 within the securing element 364 thereby centering, aligning, and securing the charging adapter to the cap 358. Any number of engaging features 372 can be included, such as two along each side of the securing element 364. The engaging features 372 can include a variety of shapes (e.g., arced or curved elongated arms) and sizes and include various features for achieving various degrees of secure coupling. Any number of engaging features 372 can be included along one or more sides of the securing element 364 without departing from the scope of this disclosure.

As shown in FIGS. 4A-4C, the securing element 364 can further include a pair of angled tabs 374 that assist with centering and securing the securing element 364 relative to the cap housing 368. For example, the cap housing 368 can include angled features that the angled tabs 374 can mate against when the securing element 364 is sufficiently coupled to the cap housing 368. One or more features along the inner chamber 366 may also be included for assisting with aligning the securing element 364 relative to the inner chamber 366 and securing the securing element 364 to the cap housing 368. For example, the inner chamber 366 of the cap housing 368 can include one or more extruded rails that provide friction along the sides of the securing element 364 thereby assisting with preventing the securing element 364 from decoupling from the inner chamber 366.

As shown in FIGS. 4A-4C, the securing element 364 can further include one or more flanges 376 that extend from a second end of the securing element 364 and extend away from the inner chamber 366 of the securing element 364. The flanges 376 may assist with guiding the USB feature 354 into the inner chamber 366 of the securing element 364, including preventing the USB feature 354 from getting snagged or damaged from a side of the cap 358 or securing element 364.

The cap 358 may include a variety of features for securing to and protecting the charging adapter, as well as improve usability and convenience for a user. The charging adapter assembly can be lightweight and/or less bulky compared to some currently available vaporizer charging devices. The charging adapter assembly can be generally aesthetically pleasing and/or easy to use. The cap 358 may be easy to remove and/or couple to the charging adapter. In some implementations, the charging adapter assembly can be dust, lint and/or water resistant, and/or may limit dust or liquids from entering the interior volume of the charging adapter, such as when the cap 358 is coupled to the charging adapter. All or part of the charging adapter assembly may have rounded edges. All or part of the charging adapter assembly may be made of a corrosion resistant material, a biocompatible material, a plastic material, an aluminum material, and/or other materials.

In some examples of the current subject matter, the at least two cartridge contacts 124 and the at least two receptacle contacts 125 can be configured to electrically connect in either of at least two orientations. In other words, one or more circuits necessary for operation of the vaporizer can be completed by insertion of a vaporizer cartridge 120 in the cartridge receptacle 118 in a first rotational orientation (around an axis along which the end of the vaporizer cartridge having the cartridge is inserted into the cartridge receptacle 118 of the vaporizer body 110) such that a first cartridge contact of the at least two cartridge contacts 124 is electrically connected to a first receptacle contact of the at least two receptacle contacts 125 and a second cartridge contact of the at least two cartridge contacts 124 is electrically connected to a second receptacle contact of the at least two receptacle contacts 125. Furthermore, the one or more circuits necessary for operation of the vaporizer can be completed by insertion of a vaporizer cartridge 120 in the cartridge receptacle 118 in a second rotational orientation such that the first cartridge contact of the at least two cartridge contacts 124 is electrically connected to the second receptacle contact of the at least two receptacle contacts 125 and the second cartridge contact of the at least two cartridge contacts 124 is electrically connected to the first receptacle contact of the at least two receptacle contacts 125. This feature of a vaporizer cartridge 120 being reversible insertable into a cartridge receptacle 118 of the vaporizer body 110 is described further below.

In one example of an attachment structure for coupling a vaporizer cartridge 120 to a vaporizer body, the vaporizer body 110 includes a detent (e.g., a dimple, protrusion, etc.) protruding inwardly from an inner surface the cartridge receptacle 118. One or more exterior surfaces of the vaporizer cartridge 120 can include corresponding recesses (not shown in FIG. 1) that can fit and/or otherwise snap over such detents when an end of the vaporizer cartridge 120 inserted into the cartridge receptacle 118 on the vaporizer body 110. When the vaporizer cartridge 120 and the vaporizer body 110 are coupled (e.g., by insertion of an end of the vaporizer cartridge 120 into the cartridge receptacle 118 of the vaporizer body 110, the detent into the vaporizer body 110 may fit within and/or otherwise be held within the recesses of the vaporizer cartridge 120 to hold the vaporizer cartridge 120 in place when assembled. Such a detent-recess assembly can provide enough support to hold the vaporizer cartridge 120 in place to ensure good contact between the at least two cartridge contacts 124 and the at least two receptacle contacts 125, while allowing release of the vaporizer cartridge 120 from the vaporizer body 110 when a user pulls with reasonable force on the vaporizer cartridge 120 to disengage the vaporizer cartridge 120 from the cartridge receptacle 118.

Further to the discussion above about the electrical connections between a vaporizer cartridge and a vaporizer body being reversible such that at least two rotational orientations of the vaporizer cartridge in the cartridge receptacle are possible, in some vaporizers the shape of the vaporizer cartridge, or at least a shape of the end of the vaporizer cartridge that is configured for insertion into the cartridge receptacle may have rotational symmetry of at least order two. In other words, the vaporizer cartridge or at least the insertable end of the vaporizer cartridge may be symmetric upon a rotation of 180° around an axis along which the vaporizer cartridge is inserted into the cartridge receptacle. In such a configuration, the circuitry of the vaporizer may support identical operation regardless of which symmetrical orientation of the vaporizer cartridge occurs.

In some examples, the vaporizer cartridge, or at least an end of the vaporizer cartridge configured for insertion in the cartridge receptacle may have a non-circular cross section transverse to the axis along which the vaporizer cartridge is inserted into the cartridge receptacle. For example, the non-circular cross section may be approximately rectangular, approximately elliptical (e.g., have an approximately oval shape), non-rectangular but with two sets of parallel or approximately parallel opposing sides (e.g., having a parallelogram-like shape), or other shapes having rotational symmetry of at least order two. In this context, approximately having a shape indicates that a basic likeness to the described shape is apparent, but that sides of the shape in question need not be completely linear and vertices need not be completely sharp. Rounding of both or either of edges or vertices of the cross-sectional shape is contemplated in the description of any non-circular cross section referred to herein.

The at least two cartridge contacts and the at least two receptacle contacts can take various forms. For example, one or both sets of contacts may include conductive pins, tabs, posts, receiving holes for pins or posts, or the like. Some types of contacts may include springs or other urging features to cause better physical and electrical contact between the contacts on the vaporizer cartridge and the vaporizer body. The electrical contacts may optionally be gold-plated, and/or can include other materials.

Terminology

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the teachings herein. For example, the order in which various described method steps are performed may often be changed in alternative embodiments, and in other alternative embodiments, one or more method steps may be skipped altogether. Optional features of various device and system embodiments may be included in some embodiments and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A portable charging adapter system for charging a vaporizer device, comprising:
   a charging adapter, comprising:
      a charging adapter housing;
      a charging dock positioned along a first surface of the charging adapter housing; and
      a power coupling feature positioned along a second surface of the charging adapter housing; and
   a charging adapter cap, comprising:
      a cap housing having an inner chamber, the inner chamber including a first pair of opposed side walls, a second pair of opposed side walls, an end wall, and an open end opposed to the end wall; and
      a securing element coupled to the inner chamber, the securing element including at least one cantilevered spring extending from one or more securing element sides of the securing element, the at least one cantilevered spring configured to engage the power coupling feature to thereby secure a coupling of the charging adapter to the cap housing.

2. The portable charging adapter system of claim 1, wherein the charging dock includes a pair of charging contacts that are configured to mate with a pair of vaporizer contacts of the vaporizer device.

3. The portable charging adapter system of claim 1, wherein the charging dock includes a recess in the charging adapter housing, the recess including an inner perimeter wall that is shaped to have a sliding fit with an outer surface of a charging end of the vaporizer device.

4. The portable charging adapter system of claim 1, wherein a first cantilevered spring of the at least one cantilevered spring includes a first cutout from a first securing element side of the one or more securing element sides, the first cantilevered spring including a first deformed feature that extends inward from the first securing element side.

5. The portable charging adapter system of claim 4, wherein the first deformed feature is configured to engage a first side of the power coupling feature.

6. The portable charging adapter system of claim 5, wherein a second cantilevered spring of the at least one cantilevered spring includes a second cutout from a second securing element side of the one or more securing element sides, the second cantilevered spring including a second deformed feature that extends inward from the second securing element side.

7. The portable charging adapter system of claim 6, wherein the second deformed feature is configured to engage a second side of the power coupling feature.

8. The portable charging adapter system of claim 7, wherein the first securing element side is orthogonal to the second securing element side.

9. The portable charging adapter system of claim 1, wherein the power coupling feature includes a USB feature.

10. The portable charging adapter system of claim 1, wherein the first surface of the charging adapter housing is positioned orthogonal to the second surface of the charging adapter housing.

11. The portable charging adapter system of claim 1, wherein the charging adapter housing includes a linking feature configured to allow the charging adapter cap to be coupled to a coupling feature.

12. The portable charging adapter system of claim 1, wherein the securing element includes a through hole positioned to receive an extruded feature along the inner chamber to thereby allow a heat-staking of the securing element to the charging adapter cap.

13. A method for a portable charging adapter system for charging a vaporizer device, the method comprising:
   receiving, at a charging dock of a charging adapter of the portable charging adapter system, a charging end of the vaporizer device, the charging adapter comprising:
      a charging adapter housing including a first surface, the charging dock being positioned along the first surface;
      a power coupling feature positioned along a second surface of the charging adapter housing; and
   coupling a charging adapter cap of the portable charging adapter system to the power coupling feature of the charging adapter, wherein the charging adapter cap comprises:
      a cap housing having an inner chamber, the inner chamber including a first pair of opposed side walls, a second pair of opposed side walls, an end wall, and an open end opposed to the end wall; and
      a securing element coupled to the inner chamber, the securing element including at least one cantilevered spring extending from one or more securing element sides of the securing element, the at least one cantilevered spring configured to engage the power coupling feature to thereby secure a coupling of the charging adapter to the cap housing.

14. The method of claim 13, further comprising:
   coupling the power coupling feature to a power source.

15. The method of claim 13, wherein the charging dock includes a pair of charging contacts that are configured to mate with a pair of vaporizer contacts of the vaporizer device.

16. The method of claim 13, wherein the charging dock includes a recess in the charging adapter housing, the recess including an inner perimeter wall that is shaped to have a sliding fit with an outer surface of the charging end of the vaporizer device.

17. The method of claim 13, wherein the power coupling feature includes a USB feature.

18. The method of claim 13, wherein the first surface of the charging adapter housing is positioned orthogonal to the second surface of the charging adapter housing.

* * * * *